United States Patent
Kan (10) Patent No.: US 7,080,047 B2
(45) Date of Patent: Jul. 18, 2006

(54) WEBSITE-SPECIFIC ELECTRONIC SIGNATURE CONTAINING PERSONALIZED LOGO

(76) Inventor: Steven S. Kan, No. 6, Alley 104, Lane 648, Ming Hu Rd., Chai Chiao Li, East District, HsinChu City (TW)

( * ) Notice: Subject to any disclaimer, the term of this patent is extended or adjusted under 35 U.S.C. 154(b) by 464 days.

(21) Appl. No.: 10/446,083

(22) Filed: May 28, 2003

(65) Prior Publication Data

US 2004/0243521 A1    Dec. 2, 2004

(51) Int. Cl.
*C06Q 99/00*    (2006.01)

(52) U.S. Cl. .............. 705/67; 705/65; 705/66; 705/75; 705/76; 705/77; 705/78; 713/182; 713/185; 713/186; 235/380

(58) Field of Classification Search ......... 705/64–79; 713/182–186; 235/380
See application file for complete search history.

(56) References Cited

U.S. PATENT DOCUMENTS

| | | | | |
|---|---|---|---|---|
| 6,422,459 | B1* | 7/2002 | Kawan ............ | 235/380 |
| 2001/0018660 | A1* | 8/2001 | Sehr ............... | 705/5 |
| 2003/0160444 | A1* | 8/2003 | Durso ............. | 283/77 |
| 2004/0056087 | A1* | 3/2004 | Bonneau et al. .... | 235/380 |
| 2004/0098352 | A1* | 5/2004 | Matsuyama ....... | 705/71 |
| 2004/0099730 | A1* | 5/2004 | Tuchler et al. .... | 235/380 |

FOREIGN PATENT DOCUMENTS

EP    0596706 A1 *    5/1994

OTHER PUBLICATIONS

Attoh-Okine et al., "Security Issues of Emerging Smart Cards Fare Collection Application in Mass Transit", 1995, IEEE.*
Chau et al., "Octopus: An E-Cash Payment System Success Story", 2003, ACM.*
Rossi et al. "Designing Personalized Web Application", May 1-5, 2001, ACM.*

* cited by examiner

*Primary Examiner*—Elisca E. Pierre
*Assistant Examiner*—Jalatee Worjloh
(74) *Attorney, Agent, or Firm*—Birch, Stewart, Kolasch & Birch, LLP (57) ABSTRACT

The present invention involves the creation of a website-specific electronic signature containing a personalized logo via a mechanism for on-line assembly of image parts to obtain personalized image. The present invention provides two applications of the website-specific electronic signature containing a personalized logo, a virtual payment card and an on-line binding purchase order. The present invention further provides two methods and a system for e-commerce use of the virtual payment card and the on-line binding purchase order. The safer and less costly on-line transaction methods and the more trustable on-line seller-buyer agreements offered by the present invention can help promote the trustworthiness and the brand value of an e-store or a payment institution.

19 Claims, 4 Drawing Sheets

Fig. 4

WEBSITE-SPECIFIC ELECTRONIC SIGNATURE CONTAINING PERSONALIZED LOGO

FIELD OF THE PRESENT INVENTION

The present invention relates to a special kind of electronic signature and its application in on-line transactions. More particularly, the electronic signature is website-specific and contains a personalized logo.

DESCRIPTION OF THE PRIOR ART

The Internet age has made e-commerce possible. Virtual banking, on-line shopping, and tax filing via the Internet are now available. Many business leaders consider a website necessary for any business to be viable in the future. There are, yet, many people who do not trust the kind of e-commerce existing today. A more trustable network environment that can better protect privacy as well as transaction information, as stored in the database or transmitted through the net, from being stolen, modified, or forged for illegitimate uses is generally considered as the key to promote on-line transactions.

There have been various patented authentication methods to secure the Internet environment. For instance, the U.S. Pat. No. 5,930,804 discloses a method and system of biometric authentication. Whether the live data is obtained from an individual's finger or eye, the method has two disadvantages. First, a costly scanning device is needed to input and convert the live images to digital data. Second, the individual undertakes some risk because criminals may chop off the finger or pull out the eye to steal the data.

A method and system for on-line assembly of a personalized image is disclosed in Taiwan Patent No. 161216. The invention involves the partitioning of a default image into several parts. Each part further has several part elements. The part elements can be classified into several categories, each representing a characteristic of the image part, such as shape, pattern, background, color, size, special effects, etc. The invention empowers a remote user to select image parts and corresponding part elements on-line for the assembly of a personalized image. It is desirable to create artificial images along the line of the disclosed invention for a safer and less costly authentication.

Electronic signature is a way to authenticate communications network users. It is common that an electronic signature is used by an individual throughout the websites. There is, nonetheless, a defect of the current practice. The individual runs a big risk because when intercepted the interceptor can use the electronic signature anywhere on the Internet. To reduce the potential risk, an improvement on electronic signature is needed such that it is website-specific and the potential loss is limited to the specific website only.

A common payment method of current on-line shopping involves a customer's entering of his/her credit card account number, which is then transmitted to and stored at the server of an e-commerce website. Many consumers are averse to the on-line payment method because they are concerned that an e-store may opportunistically request unauthorized payment from the card-issuing banks, or that an employee of the e-store may illegally use their account information to shop around on other e-stores. Similar concerns have made government services through the Internet, such as on-line tax filing, various license applications, health insurance card application, and the related on-line payment of fees or fines, not well received by the general public. An examination of current credit card payment practice in traditional stores can give a better perspective of why consumers do not sufficiently trust the common on-line payment method. In a store and after a customer have decided any item to buy, the customer renders his/her credit card to the store and authorizes payment by the card-issuing payment institution. The store then slides the card over an electronic apparatus linked to the payment institution's server and database to authenticate the card and check the customer's credit. The card and a receipt are returned by the store to the customer afterwards to complete the authorization-authentication process. The customer's account information becomes known to the store in the interim because the store operates the electronic apparatus and is recorded on the receipt. Many mishaps occur as a result of this practice. As reported in the news, counterfeit credit cards were made through hidden electronic-magnetic recording of credit card account information by unlawful stores or their employees. The common payment problem in stores or e-stores arises because they should not have access to customers' payment card information but do in the interim of the authorization-authentication process. The root cause of the problem stems from the fact that it is costly for customers' to have their own electronic apparatus for authorization and authentication purposes. As many customers can now get on the Internet or proprietary networks for e-commerce through their own electronic apparatus such as desktop or laptop computers and various types of wireless electronic gadgets, an improved method of payment authorization and account authentication to make a store or an e-store inaccessible to the private data between the customers and their payment institution is in need to promote more trustable transactions on-line, even off-line.

A more trustable e-commerce is also related to the effectiveness in enforcing the on-line agreement between a seller and a buyer. An e-marketplace can use a conditional purchase offer as disclosed in the method of U.S. Pat. No. 5,794,207 for that purpose. An e-store can retrieve the log file of a disputed transaction from the server and present it to the court as a piece of evidence against any violation of the on-line purchase agreement. On the other hand, when an e-store fails to deliver an item ordered by a remote customer, the customer hardly can provide concrete evidence to show the court that the e-store has breached the purchase agreement. The current practice, hence, is not customer-oriented and actually putting customers in a disadvantageous position. An improvement is therefore also needed for e-commerce to be more widely accepted.

SUMMARY OF THE INVENTION

An object of the present invention is to provide a method for the creation of a website-specific electronic signature containing a personalized logo. The personalized logo is assembled by a user of a website and represents an artificial image that helps the website's authentication of the user's identity.

Another object of the present invention is to provide a more trustable on-line binding purchasing order that can sufficiently identify the parties of an on-line transaction. The on-line binding purchasing order has at least a website-specific electronic signature containing a personalized logo. As a customer is authorized to assemble a personalized logo by an e-store, the website-specific electronic signature containing the personalized logo sufficiently shows the e-store being the seller of a transaction. Being assembled by the customer, the personalized logo of the on-line binding purchasing order can help show that the customer is indeed the buyer of the transaction. The on-line binding purchasing order can therefore be used as evidence to the court in time of a legal dispute about the transaction. The use of the on-line purchasing order can significantly enhance an e-store's commitment to and customers' confidence on on-line transactions and final delivery of ordered products. The on-line stores using the present invention can increase its brand value as a result.

A further object of the present invention is to provide a safer and less costly virtual payment card with a website-specific electronic signature containing a personalized logo. The website-specific electronic signature containing a personalized logo is created by the payment institution after its remote user is authorized to assemble a personalized logo. The customer's website-specific electronic signature enables authentication of the virtual payment card in use by the payment institution. The fun in assembling a personalized logo at the payment institution's website additionally helps build customer loyalty and the payment institution's brand value.

A still further object of the present invention is to provide two practical applications for the on-line use of the website-specific electronic signature, the on-line binding purchase order, and the virtual payment card in an e-commerce environment. One application enables the traditional credit card authorization-authentication process to effectively work on-line. Another application enables an improved authorization-authentication process such that e-stores as well as stores will not have access to customers' payment card account information. The present invention can significantly enhance trustworthiness of on-line transactions and increase the brand value of a website that utilizes it.

DETAILED DESCRIPTION OF THE PRESENT INVENTION

The e-commerce application of the present invention requires an assembly of a personalized logo by a remote user or an e-store for the creation of website-specific electronic signatures, an on-line binding purchase order, and a virtual payment card. The assembly of personalized logo can be completed, for instance, through the steps of what are disclosed in the Taiwan Patent No. 161216. For the purpose of illustrating how a personalized logo of the present invention can be obtained, the most relevant portion of the Taiwan patent is summarized below.

The method and system for on-line assembly of image parts to obtain a personalized image at least comprises:

(A) an image database comprising a default image, a plurality of image parts, and a plurality of part elements corresponding to and showing characteristics of the image parts, wherein the plurality of image parts can be recombined into the default image and each part element has a designated code;

(B) a user database containing remote users' identity, account, and logging data;

(C) an operational step of accepting a remote user's request to log in and use the image database in a network environment;

(D) an operational step of accepting said remote user's selection of image parts and part elements to assemble a personalized image;

(E) an operational step of generating a personalization code corresponding to the assembled personalized image, wherein the personalization code comprises the codes of every part elements selected by the remote user.

A personalized logo assembled from logo parts and corresponding logo part elements, as described above for instance, is the base of the present invention. An e-store or a payment institution of the present invention needs to authorize its logo to be personalized by its remote customers. The word 'logo' used in this application carries its common meaning of a special image representing a product, a service, an activity, or an entity. The logo of the present invention therefore includes an e-store's or a payment institution's company logo, trademarks, service marks, and other icons representing products or services. For non-profit, community, or government use of the present invention, the word 'logo' further includes the adopting entity's logo, and other icons representing the sponsored services or activities. The websites also need to make a default logo image, its constituent parts, and the part elements available for the remote users to assemble their personalized logos. The part elements of a logo image part may further be categorized into shape, pattern, background, special effect, color, and size, etc., to guide remote users' personalization of a logo.

Figure 1:
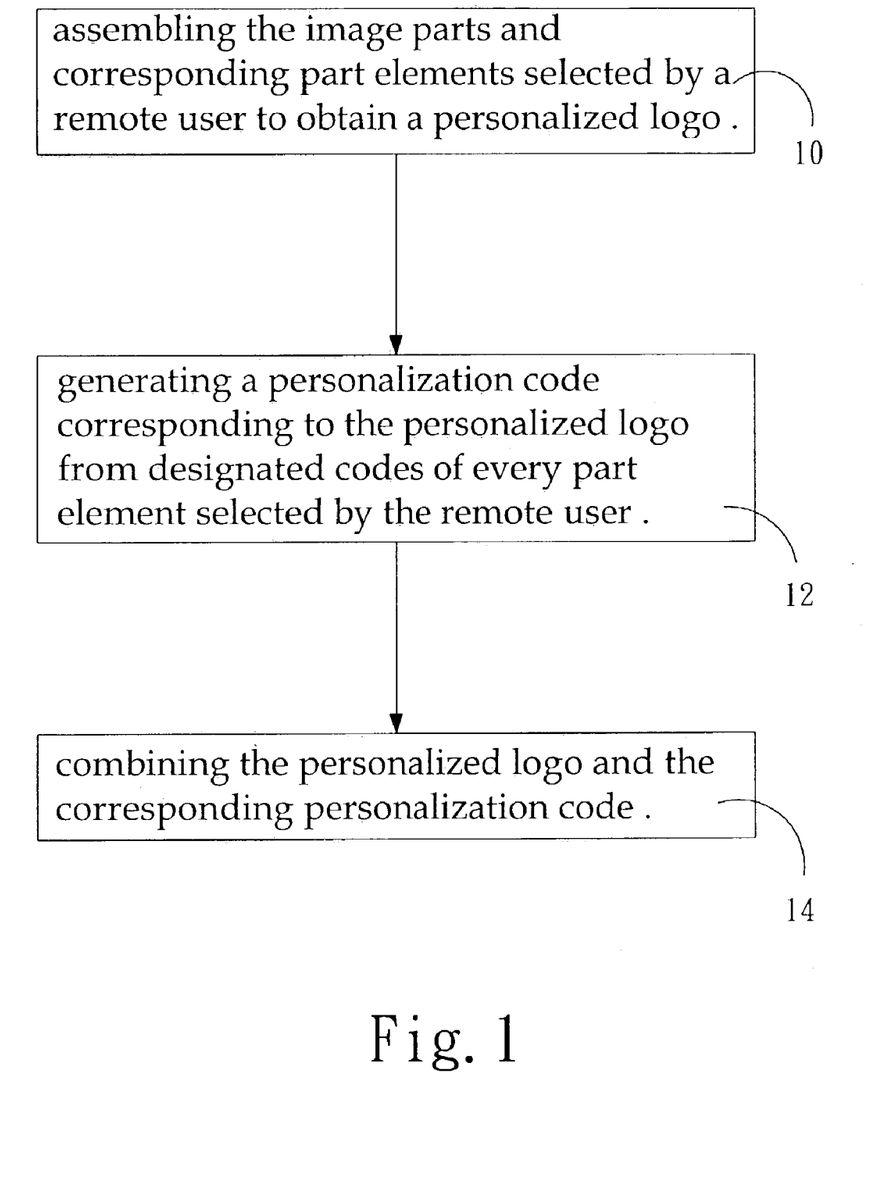
FIG. 1 is a flowchart illustrating how the present invention's website-specific electronic signature containing a personalized logo is created.

The detailed description of the present invention is in the followings. First, FIG. 1 shows the flowchart of the present invention's creation of a website-specific electronic signature containing a personalized logo. Step 10 assembles the image parts and corresponding part elements selected by a remote user to obtain a personalized logo. Step 12 generates a personalization code corresponding to the personalized logo from designated codes of every part element selected by the remote user. Step 14 combines the personalized logo and the corresponding personalization code. The website-specific electronic signature can further comprise information of the remote user's identity and the time when the website-specific electronic signature containing the personalized logo is invoked.

Figure 2:
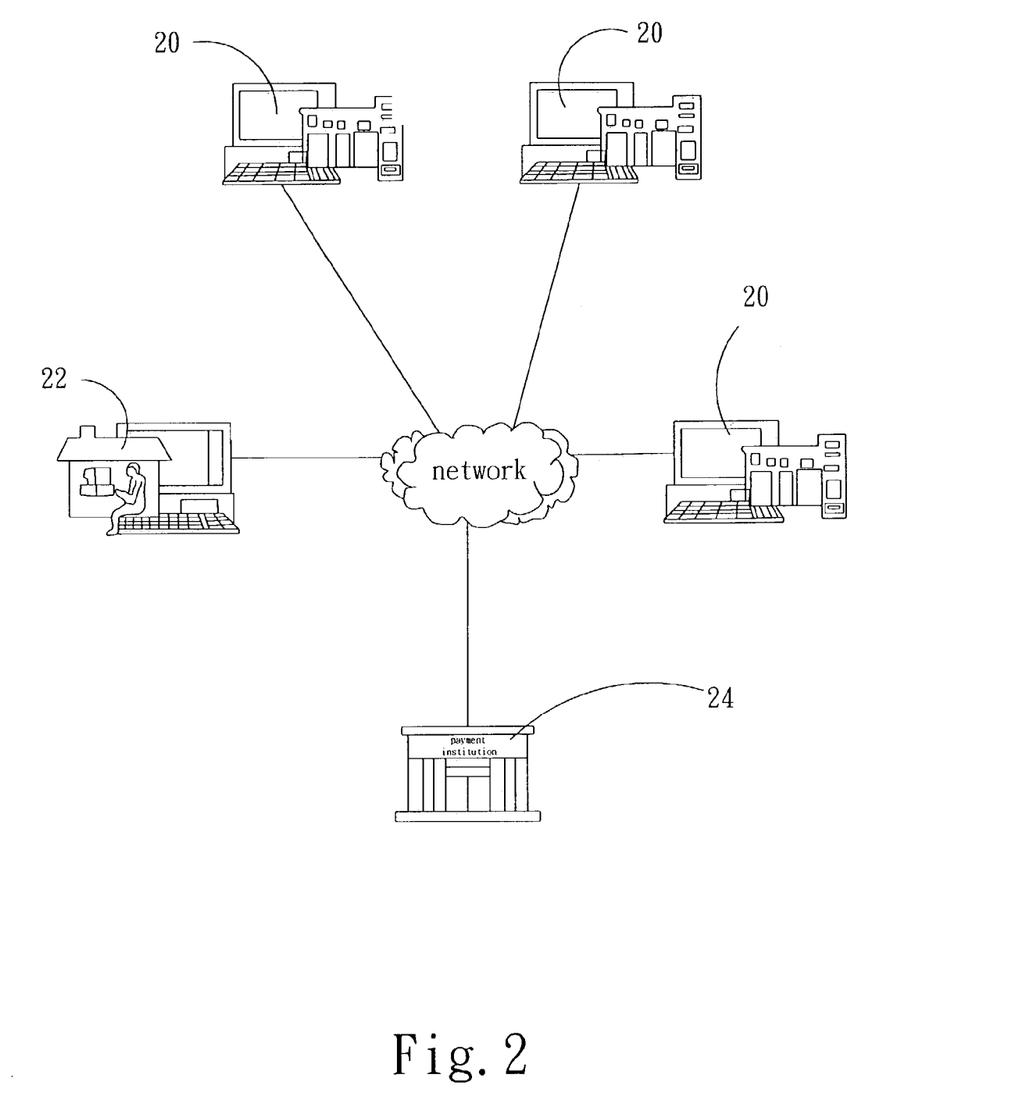
FIG. 2 is a block diagram showing the e-commerce environment of the present invention.

FIG. 2 illustrates in a block diagram the e-commerce environment of the present invention's practical applications of a website-specific electronic signature containing a personalized logo. The e-commerce environment encompasses at least an e-store 20, a remote user 22, and a payment institution 24. The e-store 20 and the payment institution 24, respectively, authorizes the remote user 22 to assemble a personalized logo and creates the remote customer's website-specific electronic signature containing a personalized logo at its website according to the flowchart shown in FIG. 1. The remote user's electronic apparatus is connected to the servers of the e-store 20 and the payment institution through a communications network, including Internet, World Wide Web, Local Area Network, Proprietary Network, and wireless communications network, etc., to conduct on-line transactions. The remote user 22 uses a mobile phone, personal digital assistants (PDAs), palm computer, information appliance, desktop computer, notebook computers, or a flat plate computer, all with a network access capability, to create a website-specific electronic signature containing a personalized logo, when it is connected to the e-store's or the payment institution's server. The website-specific electronic signature containing a personalized logo can further include information of the remote user's identity and the time when the website-specific electronic signature is invoked.

The server of the payment institution 22 has the capability to enable a remote customer to assemble personalized logo and create a website-specific electronic signature containing a personalized logo. The server of the payment institution 24 can also enable the remote customer 22 to create a virtual payment card with the website-specific electronic signature containing the personalized logo. The virtual payment card can further include information of the remote user's identity, a payment account number, an expiration date, and the issuing date. Similarly, the server of the payment institution 24 can authorize the e-store 20 to create its website-specific electronic signature containing a personalized logo at the payment institution 24. In this case, the e-store's website electronic signature containing a personalized logo further includes information of the e-store's identity, instead of a remote customer's identity, as well as the time when it is invoked.

The server of the e-store 20 also has the capability to enable the remote customer 22 to assemble a personalized logo and create a website-specific electronic signature containing a personalized logo. The server of the e-store 20 can also create an on-line binding purchase order with at least a website-specific electronic signature containing a personalized logo. The on-line binding purchase order further comprises an on-line purchase order including the information of the ordered product, the ordered quantity, the product price, the remote customer's identity, and the e-store's identity.

Figure 3:
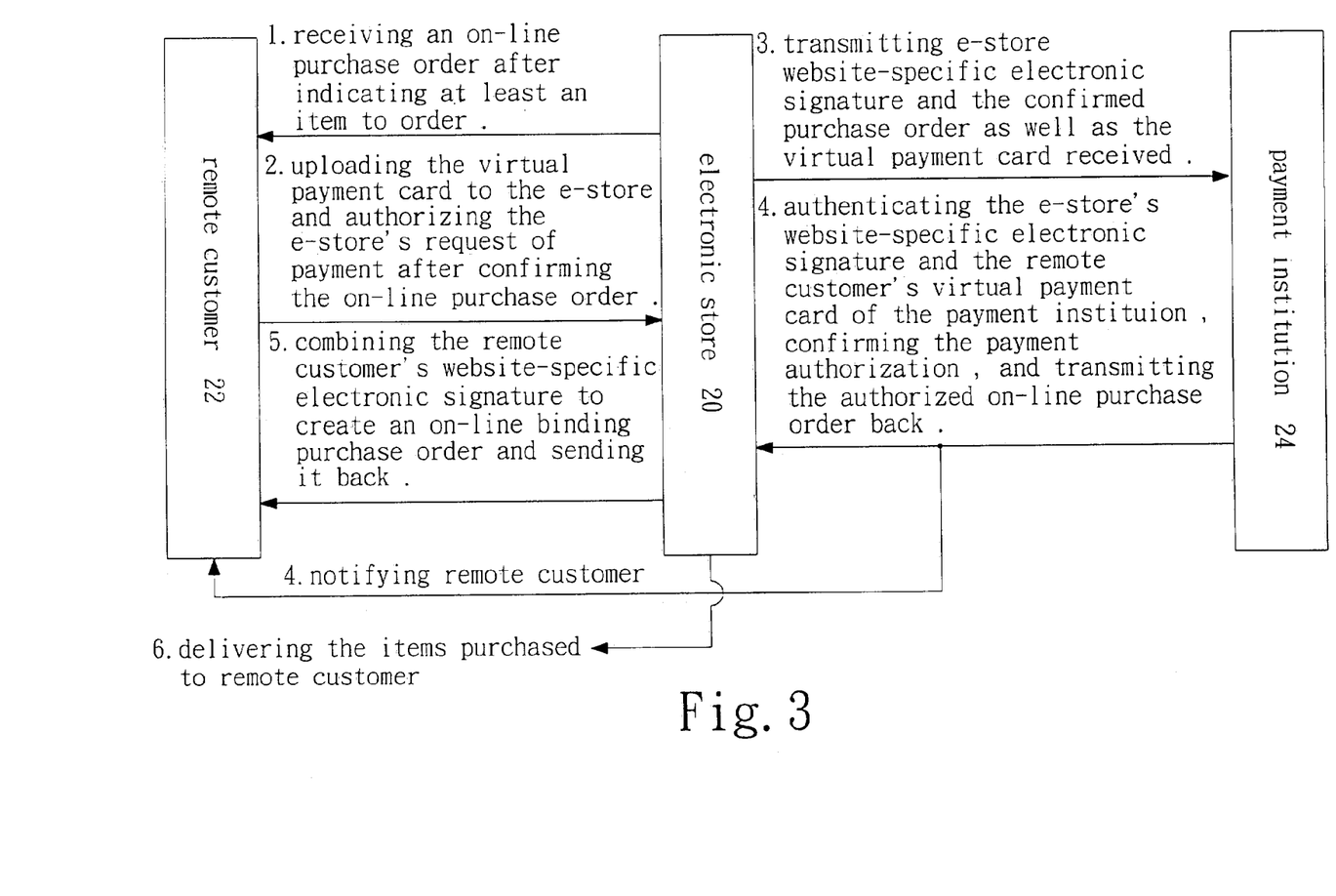
FIG. 3 is a flowchart illustrating the first application's operational steps for the use of the on-line binding purchase order and the virtual payment card.

FIG. 3 is a flowchart illustrating the first application of the present invention's virtual payment card and on-line binding purchase order with a website-specific electronic signature containing a personalized logo in an e-commerce environment. The application involves personalization of logos by remote customers and e-stores along the steps described at the beginning of the detailed description section. To avoiding repetition, we only explain the steps after personalization of logos being completed in the following. In step 1 the remote customer 22, after indicating at least an item to order, receives an on-line purchase order from the e-store 20. After confirming the on-line purchase order, the remote customer 22 then in step 2 uploads the virtual payment card with a website-specific electronic signature containing a personalized logo to the e-store and authorizes the e-store's request of payment to the payment institution 24. In step 3 the e-store 20 transmits its website-specific electronic signature containing the payment institution's 24 logo and the confirmed purchase order as well as the virtual payment card received from the remote customer 22 to the payment institution 24 to request payments. The payment institution 24 authenticates in step 4 the e-store's website-specific electronic signature and the remote customer's virtual payment card of the payment institution, confirms the payment authorization, and transmits the authorized on-line purchase order back to the e-store 20. In step 5 the server of the e-store 20 combines the remote customer's website-specific electronic signature containing a personalized logo of the e-store with the authorized purchase order to create an on-line binding purchase order and sends it back to the remote customer 22. Finally, the e-store 20 is then ready to deliver the items purchased to the remote customer 22.

The on-line binding purchase order of the present invention has the efficacy of a traditional purchase agreement between a seller and a buyer. The personalize logo associated with the on-line binding purchase order indicates clearly that the remote customer 22 is the one who has personalized a logo at the e-store's website and, therefore, works like a buyer signature of a traditional purchase agreement. Since the remote customer's personalization is authorized by the e-store 20, the website-specific electronic signature containing the personalized logo indicates clearly that the e-store 20 is the seller and, therefore, works like a seller signature of a traditional purchase agreement. An advantage of the present invention's on-line binding purchase order is that the cost of forging is high, because of a complicated image creation process, and the benefit of forging is low, because the electronic signature is only useful at the particular website.

In sum, there are two special features of the described application of the present invention's virtual payment card and on-line binding purchase order. First, the on-line payment authorization and authentication steps mimic what exist in today's off-line business transaction using a credit card. In short, it is driven by a business entity after a customer has selected purchase items and rendered his/her credit card to the store. The credit card is then slid through a dedicated electronic apparatus that is linked to a remote server containing a database for authentication and payment authorization. After getting approval from the payment institution, the business entity returns a receipt of the transaction to the customer. While current on-line transactions adopt a different mode, the disclosed application enables the same practice to be conveniently carried out on-line. Second, the method of the present invention does not require a dedicated electronic apparatus, or the keying-in of a payment account number. The method thus not only provides a more convenient way of on-line payment at a lower cost, but also help ease customers' concerns over illegitimate use of their payment account numbers and opportunistic breach of purchase agreements by an e-store.

Despite the above advantages, the disclosed method does involve the transmitting of a virtual payment card by the remote customer 22 to the e-store 20. The virtual payment card hence may still be intercepted by a disgraceful employee of the e-store for illicit use at other e-stores. Therefore, the present invention further discloses a second and improved application of the present invention's virtual payment card and on-line binding purchase order with a website-specific electronic signature containing a personalized logo in an e-commerce environment.

Figure 4:
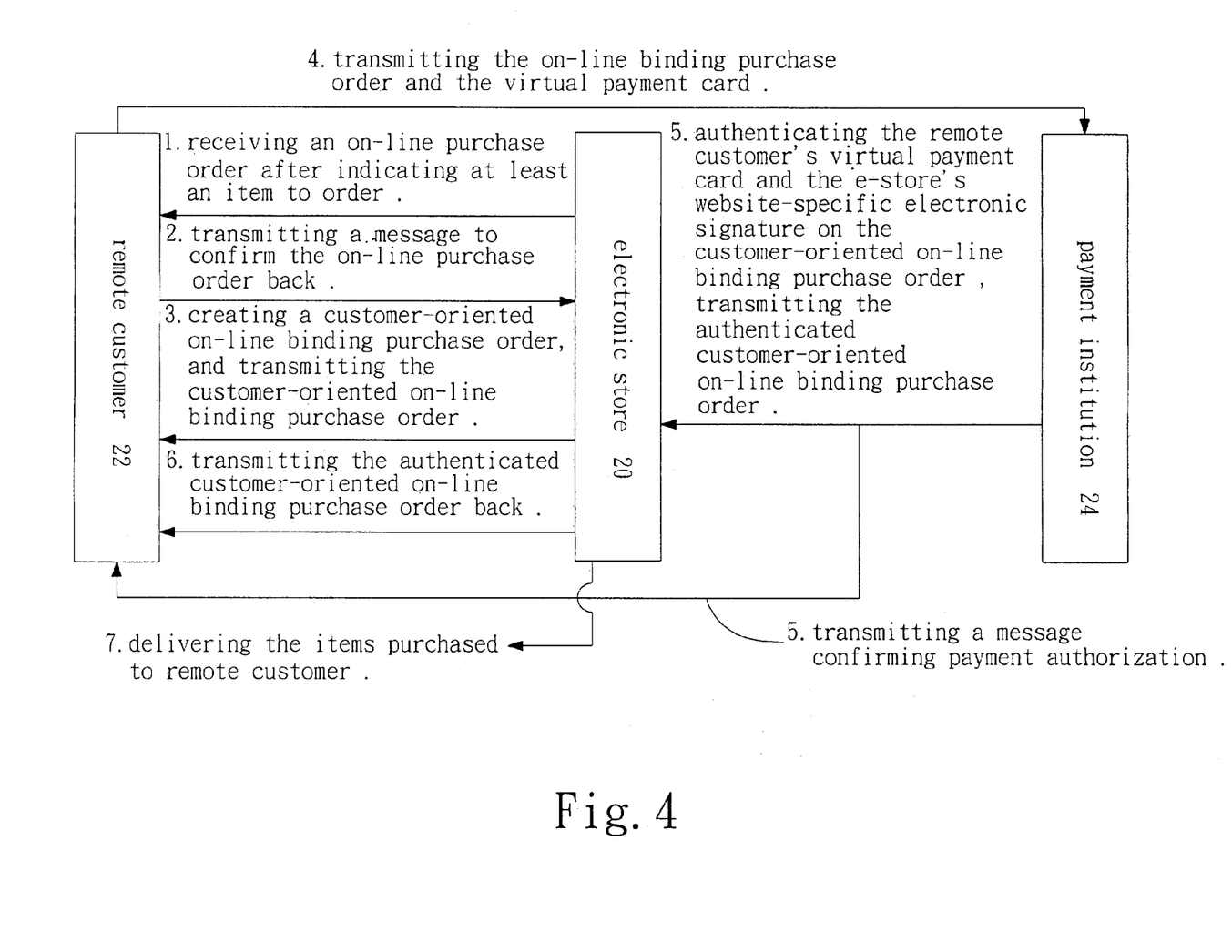
FIG. 4 is a flowchart illustrating the second application's operational steps for the use of the on-line binding purchase order and the virtual payment card.

FIG. 4 shows the flowchart of the second application of the present invention's virtual payment card and on-line binding purchase order with a website-specific electronic signature containing a personalized logo in an e-commerce environment. The application involves personalization of logos by remote customers and e-stores along the steps described at the beginning of the detailed description section. To avoiding repetition, we only explain the steps after personalization of logos being completed in the following. As shown in FIG. 4, in step 1 the remote customer 22 receives, after indicating at least an item to order, an on-line purchase order from the e-store 20. In step 2 the remote customer 22 transmits a message confirming the on-line purchase order back to the e-store 20. In step 3, the server of the e-store 20 creates a customer-oriented on-line binding purchase order with both the e-store's website-specific electronic signature containing its personalized logo of the payment institution 24 and the remote customer's 22 website-specific electronic signature containing his/her personalized logo of the e-store 20, and transmits the customer-oriented on-line binding purchase order to the remote customer 22. In step 4, the remote customer 22 transmits his/her virtual payment card and the customer-oriented on-line binding purchase order to the payment institution 24. In step 5, the payment institution 24 authenticates the remote customer's virtual payment card and the e-store's website-specific electronic signature on the customer-oriented on-line binding purchase order, and transmits a message confirming payment authorization to the remote customer 22 and the authenticated customer-oriented on-line binding purchase order to the e-store 20. In step 6 the e-store 20 transmits the authenticated customer-oriented on-line binding purchase back to the remote customer 22. Finally, the e-store 20 is then ready to deliver the items purchased to the remote customer 22.

A special feature of the second application of the present invention's virtual payment card and on-line binding purchase order in an e-commerce environment is that it is entirely customer-oriented. The on-line binding purchase order is customer-oriented in the sense that the e-store 20 shows its commitment to the purchase order by rendering its website-specific electronic signature of the payment institution 24 to the remote customer 22. In addition, the payment authorization and authentication process is driven by the remote customer 22. As a result, the e-store 20 in no time has access to the remote customer's virtual payment card, and is only a passive party, as it should be, in the authorization-authentication process. The method not only corrects the serious flaw of current off-line credit card authentication practice that has resulted in numerous counterfeiting plastic credit cards, but also enables the improved method of making a seller passive in the process of payment authentication and authorization to be practically useful in promoting the future development of on-line transactions.

The uniquely advantageous features of the present invention are further summarized as follows:

1. Utilizing on-line assembly of a personalized logo and the corresponding personalization code, the present invention enables remote users to have website-specific electronic signatures and to reduce the risk of having an electronic signature for all websites. In addition to the functionality, through personalization of a logo, the present invention enables more interesting electronic signatures.

2. Utilizing artificially assembled image and the corresponding code, the present invention provides a less costly way for authentication in an e-commerce environment.

3. The present invention enables customers' higher trust on an e-store or payment institution through the disclosed applications of on-line binding purchase order and virtual payment card in e-commerce. In addition, the associated personalized logo of an e-store or payment institution can help build its customers' loyalty and brand value.

4. Those skilled in the art can implement the present invention in an e-portal, e-media, e-community, e-marketplace, or a government website, etc. The present invention enables not only better public services for non-profit or government websites, but also increased competitiveness for an adopting private business website. The present invention provides a low cost way of showing an appreciation for all types of users' demand for personalization and satisfying users' insistence of a safer and more trustable e-commerce.

5. The present invention can also be implemented via the use of mobile phones, personal digital assistants (PDAs), or palm computers with network accessing capability to assemble on-line personalized logos, create website-specific electronic signatures as well as virtual payment cards, and use them in e-commerce. An implementation of the present invention can also render the above mentioned wireless electronic apparatus to become a mobile virtual payment card transmitter such that current plastic payment cards and credit card machines at traditional stores would become obsolete. Then, not only virtual but also real transactions can be executed with the seller as a passive party of the payment authorization and authentication process.

While the present invention has been described above in terms of specific embodiments, it is to he understood that they are merely illustrative and the invention is not limited to the disclosed embodiments. On the contrary, the present invention is intended to cover various changes, alterations, rearrangements, modifications and equivalent structures included within the spirit and scope of the appended claims.

The invention claimed is:

1. A method of applying a website-specific electronic signature containing a personalized logo to an e-store-driven e-commerce environment encompassing at least a number of remote customers, an e-store, and a payment institution, wherein the e-store and the payment institution, respectively, provides a mechanism for a remote customer's on-line assembly of image parts to obtain a personalized logo at its website, the method comprising the steps of:

(A) personalizing a first logo at a payment institution's website by a remote customer to create said remote customer's website-specific electronic signature containing the first personalized logo and virtual payment card with the website-specific electronic signature containing the first personalized logo;

(B) personalizing a second logo at said payment institution's website by an e-store to create its website-specific electronic signature containing the second personalized logo;

(C) personalizing a third logo at an e-store's website by said remote customer to create said remote customer's website-specific electronic signature containing the third personalized logo;

(D) receiving an on-line purchase order, by said remote customer, from said e-store after said remote customer having indicated at least a product to order, wherein the on-line purchase order contains information of an ordered product, an ordered quantity, a product price, said remote customer's identity, and said e-store's identity; and transmitting by said remote customer, after confirmation, the on-line purchase order and said remote customer's virtual payment card with the website-specific electronic signature containing the first personalized logo back to said e-store;

(E) transmitting by said e-store its website-specific electronic signature containing the second personalized logo, said remote customer's virtual payment card with the website-specific electronic signature containing the first personalized logo, and the confirmed on-line purchase order to said payment institution;

(F) authenticating, by said payment institution, said e-store's website-specific electronic signature containing the second personalized logo and said remote customer's virtual payment card with the website-specific electronic signature containing the first personalized logo; and transmitting, by said payment institution, a message confirming payment authorization to said remote customer and the confirmed on-line purchase order back to said e-store;

(G) creating, by said e-store, an on-line binding purchase order with said remote customer's website-specific electronic signature containing the third personalized logo; and transmitting, by said e-store, the on-line binding purchase order with the website-specific electronic signature containing the third personalized logo to said remote customer.

2. The method of claim 1, wherein said remote customer's website-specific electronic signature containing the first personalized logo further comprises a personalization code corresponding to the first personalized logo.

3. The method of 1, wherein said remote customer's virtual payment card further comprises information of said remote user's identity, a payment account number, an expiration date and an issuing date.

4. The method of claim 1, wherein said e-store's website-specific electronic signature containing the second personalized logo further comprises a personalization code corresponding to the second personalized logo, said e-store's identity and the time when the electronic signature is invoked.

5. The method of claim 1, wherein said remote customer's website-specific electronic signature containing the third personalized logo further comprises a personalization code corresponding to the third personalized logo, said remote customer's identity, and the time when the electronic signature is invoked.

6. A method of applying a website-specific electronic signature containing a personalized logo to a customer-oriented e-commerce environment encompassing at least a number of remote customers, an e-store, and a payment institution, wherein the e-store and the payment institution, respectively, provides a mechanism for a remote customer's on-line assembly of image parts to obtain a personalized logo at its website, the method comprising the steps of:

(A) personalizing a first logo at said payment institution's website by a remote customer to create said remote customer's website-specific electronic signature containing the first personalized logo and virtual payment card with the website-specific electronic signature containing the first personalized logo;

(B) personalizing a second logo at said payment institution's website by said e-store to create its website-specific electronic signature containing the second personalized logo;

(C) personalizing a third logo at said e-store's website by said remote customer to create said remote customer's website-specific electronic signature containing the third personalized logo;

(D) receiving an on-line purchase order, by said remote customer, from said e-store after said remote customer having indicated at least a product to order, wherein the on-line purchase order contains information of an ordered product, an ordered quantity, a product price, said remote customer's identity and said e-store's identity; and transmitting by said remote customer a message confirming the on-line purchase order back to said e-store;

(E) creating, by said e-store, a customer-oriented on-line binding purchase order with both the e-store's website-specific electronic signature containing the second personalized logo and said remote customer's website-specific electronic signature containing the third personalized logo; and transmitting, by said e-store, the customer-oriented on-line binding purchase order back to said remote customer;

(F) transmitting, by said remote customer, said remote customer's virtual payment card with the website-specific electronic signature containing the first personalized logo and the customer-oriented on-line binding purchase order received from said e-store to said payment institution;

(G) authenticating, by said payment institution, said e-store's website-specific electronic signature containing the second personalized logo and said remote customer's virtual payment card with the website-specific electronic signature containing the first personalized logo; and transmitting, by said payment institution, a message confirming payment authorization to said remote customer, and the authenticated customer-oriented on-line binding purchase order to said e-store;

(H) transmitting by said e-store the authenticated customer-oriented on-line binding purchase order to said remote customer.

7. The method of claim 6, wherein said remote customer's website-specific electronic signature containing the first personalized logo further comprises a personalization code corresponding to the first personalized logo.

8. The method of claim 6, wherein said remote customer's virtual payment card further comprises information of said remote user's identity, a payment account number, an expiration date, and an issuing date.

9. The method of claim 6, wherein said e-store's website-specific electronic signature containing the second personalized logo further comprises a personalization code corresponding to the second personalized logo, the e-store's identity and the time when the electronic signature is invoked.

10. The method of claim 6, wherein said remote customer's website-specific electronic signature containing the third personalized logo further comprises a personalization code corresponding to the third personalized logo, said remote customer's identity, and the time when the electronic signature is invoked.

11. The claims of 1 or 6, wherein the mechanism for a remote customer's on-line assembly of image parts to obtain a personalized logo comprises:

(A) an image database comprising a default image, a plurality of image parts, and a plurality of part elements corresponding to and showing characteristics of the image parts, wherein the plurality of image parts can be recombined into the default image and each part element has a designated code;

(B) a user database containing remote users' identities, accounts, and logging data;

(C) an operational step of accepting a remote user's request to log in and use the image database in a network environment;

(D) an operational step of accepting the remote user's selection of image parts and part elements to assemble a personalized image;

(E) an operational step of generating a personalization code corresponding to the assembled personalized image, wherein the personalization code comprises codes of each part elements selected by the remote user.

12. A system for e-commerce application of a website-specific electronic signature containing a personalized logo to a communications network environment encompassing at least a number of remote customers, an e-store, and a payment institution, wherein the e-store and the payment institution, respectively, provides a mechanism for a remote customer's on-line assembly of image parts to obtain a personalized logo at its website, the system comprising at least:

(A) a server at said payment institution to enable, respectively, the assembly of image parts for the creation of a remote customer's virtual payment card with the website-specific electronic signature containing the first personalized logo and said e-store's website-specific electronic signature containing the second personalized logo, and to authenticate, respectively, said remote customer's virtual payment card with the website-specific electronic signature containing the first personalized logo and said e-store's website-specific electronic signature containing the second personalized logo;

(B) a server at said e-store to enable the assembly of image parts for the creation of said remote customer's website-specific electronic signature containing the third personalized logo, to authenticate said remote customer's website-specific electronic signature containing the third personalized logo, and to create an on-line binding purchase order with at least a website-specific electronic signature containing a personalized logo;

(C) an electronic apparatus to link said remote customer with the servers of said payment institution and said e-store.

13. The system of claim 12, wherein the communications network environment includes Internet, World Wide Web, Local Area Network, Proprietary Network, and wireless network.

14. The system of claim 12, wherein said remote customer's website-specific electronic signature containing the first personalized logo further comprises a personalization code corresponding to the first personalized logo.

15. The system of claim 12, wherein said remote customers virtual payment card with the website-specific electronic signature containing the first personalized logo further comprises information of said remote user's identity, a payment account number, an expiration date and an issuing date.

16. The system of claim 12, wherein said e-store's website-specific electronic signature containing the second personalized logo further comprises a personalization code corresponding to the second personalized logo, said e-store's identity and the time when the electronic signature is invoked.

17. The system of claim 12, wherein said remote customer's website-specific electronic signature containing the third personalized logo further comprises a personalization code corresponding to the third personalized logo, said remote customer's identity and the time when the electronic signature is invoked.

18. The system of claim 12, wherein the on-line binding purchase order with at least a website-specific electronic signature containing a personalized logo further comprises an on-line purchase order including the information of an ordered product, an ordered quantity, a product price, said remote customer's identity, and said e-store's identity.

19. The system of claim 12, wherein the electronic apparatus linking the remote customer with a communications network can be one of the following: a mobile phone, a personal digital assistant (PDA), a palm PC, an information appliance, a desktop computer, a notebook computer, and a flat plate computer.

* * * * *